J. W. IVORY.
NUT LOCK OR FASTENER.
APPLICATION FILED JUNE 13, 1919.

1,376,624.

Patented May 3, 1921.

INVENTOR:
James W. Ivory.
BY Diederich + Fairbanks
ATTORNEYS.

UNITED STATES PATENT OFFICE.

JAMES W. IVORY, OF PHILADELPHIA, PENNSYLVANIA.

NUT LOCK OR FASTENER.

1,376,624.  Specification of Letters Patent.  Patented May 3, 1921.

Application filed June 13, 1919. Serial No. 303,823.

*To all whom it may concern:*

Be it known that I, JAMES W. IVORY, a subject of the King of Great Britain, residing in the city and county of Philadelphia, State of Pennsylvania, have invented a new and useful Nut Lock or Fastener, of which the following is a specification.

My invention relates to a nut lock or fastener, and consists of a bolt proper which is provided with a supplemental stub or bolt, the latter being adapted to be connected with the end of the former as a continuity thereof, said bolt proper and said supplemental stub or bolt having threads respectively reversely pitched, a nut adapted to be screwed upon the threads of the bolt proper, and an arch shaped clevis whose crown is fitted freely on the threads of the supplemental stud or bolt and whose legs are adapted to engage the face of said nut, the head of the supplemental stub being adapted to tighten the clevis on the nut whereby the latter is resisted in its attempts to unscrew and so it remains effectively locked or fastened.

It consists also in providing the nut with seats for the limbs of the clevis whereby the latter is prevented from slipping from the nut.

The invention is satisfactorily illustrated in the accompanying drawing, but the important instrumentalities thereof may be varied, and so it is to be understood that the invention is not limited to the specific details shown and described, as long as they are within the spirit or scope of the claims.

Similar numerals of reference indicate corresponding parts in the figures.

Figure 1:
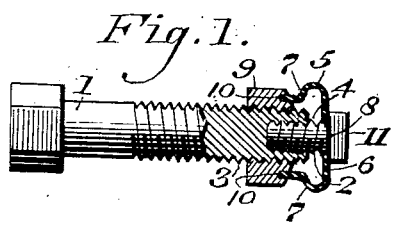
Figure 1 represents a partial side elevation and partial longitudinal section of a nut lock or fastener embodying my invention.
Figure 3:
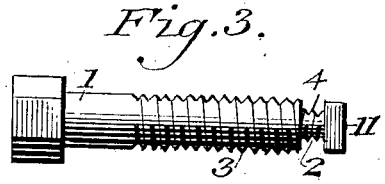
Fig. 3 represents a side elevation of a portion of the device.
Figure 11:
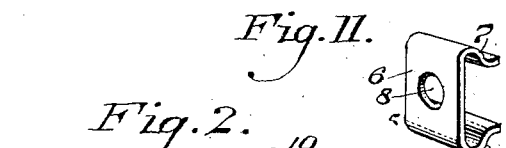
Fig. 11 represents a perspective view of the clevis employed.

Referring to the drawings.

1 designates a bolt proper of conventional form and 2 designates a supplemental stub or bolt which is of less diameter than said bolt proper and adapted to be screwed into the end of said bolt proper as a continuity thereof, it being noticed that the threads 3 of the bolt proper are reversely pitched from the threads 4 of the supplemental stub.

5 designates an arch shaped clevis which is formed of resilient or spring-like metal and consists of the crown 6 and the legs 7, said crown having therein the opening 8 whereby the crown is adapted to be fitted freely on the supplemental stub or bolt 2.

9 designates a nut to be locked or fastened, the same having its face adapted to be engaged by the terminals of the legs 7 of the clevis, for which purpose said face is formed with grooves or recesses 10 in which said terminals are seated.

The outer end of the supplemental stub is provided with the head 11 which is adapted to tighten against the outer face of the crown of the clevis.

The operation is as follows:—

Figure 2:
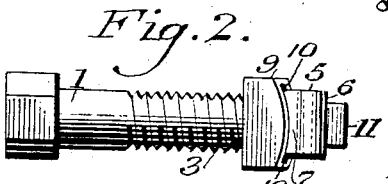
Fig. 2 represents a complete side elevation of the device.
Figure 4:
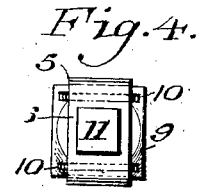
Fig. 4 represents an end view of the device.
Figure 5:
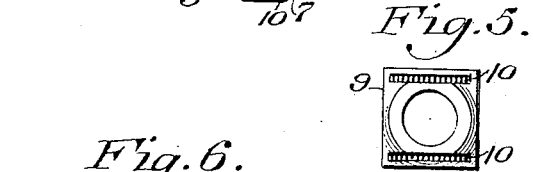
Fig. 5 represents a face view of the nut employed.
Figure 6:
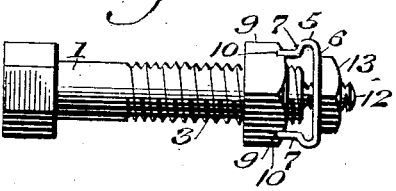
Figs. 6 and 7 represent side elevations of other embodiments of the invention.
Figure 7:
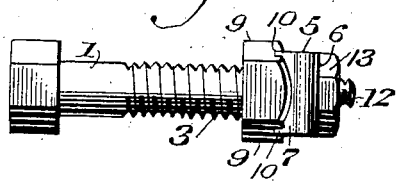
Figure 8:
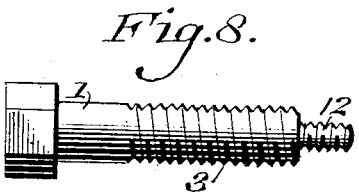
Fig. 8 represents a side elevation of the form shown in Figs. 6 and 7.
Figure 9:
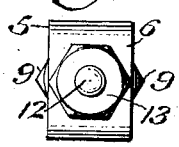
Fig. 9 represents an end view of the form shown in Fig. 6.
Figure 10:
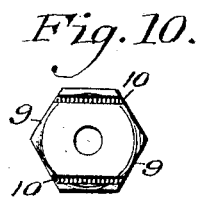
Fig. 10 represents a face view of the nut shown in Figs. 7 and 9.

The nut is screwed on the bolt proper 1 to the required extent. Then the clevis has its crown fitted on the shank of the stub 2 and its legs inserted in the grooves 10 of the nut, when the stub is rotated whereby the head of the latter compresses the crown of the clevis and forces the legs 7 tightly in the grooves 10 whereby the nut is firmly engaged by the clevis, while the latter is frictionally engaged by the head of the stub so that rotation of the clevis is prevented. Consequently if the nut attempts to unscrew it is resisted by the clevis under control of the head of the stub, the threads of the latter being in reverse direction to those of the bolt proper as has been stated, the stub being incapable of unscrewing in the same direction of the nut, hence the nut is held tightly in its adjusted position, and so cannot become unlocked or unfastened, the position of the parts being readily shown in Figs. 1, 2 and 4.

When the stub is unscrewed, from the bolt, the clevis is removable from the nut when the latter may be unscrewed as usual.

In Figs. 6, 7, 8 and 9, I show the bolt as provided with the stub 12 which is an integral portion of said bolt, the shank of said stub being threaded in its outer end so that it may have the nut 13, the latter being adapted to bear against the crown of the clevis and accomplish the same result as the head 11 of the stub in the previous figures, said nut thus comprising the head of the stub.

As the clevis is of resilient nature, it may be forced tightly against the nut to be properly seated therein and highly frictionally-engaged by the head of the stub, so that improper rotation of the latter is prevented.

Furthermore, by reason of the resilient crown and legs and the intermediate outward bulges, the more the nut is tightened the greater the pressure against the inner face of the nut, and by reason of the bulges being forced outward the greater is the hold of the ends of the legs in the recesses in the nut 9, the said legs being thus prevented from displacements from the walls of said recesses.

It is evident that my invention may be applied to washers of bolts, screws, etc. of various devices other than for nuts, to lock or fasten the same.

Having thus described my invention what I claim as new and desire to secure by Letters Patent, is:—

1. In a nut fastener, a nut adapted to be fitted on a bolt and having recesses on the outer face thereof, a clevis of resilient material having spring legs adapted to be engaged in said recesses, and a member having threaded engagement with the bolt and engageable with the clevis to compress the crown of the latter.

2. In a nut fastener, a bolt, a stub projecting therefrom, a nut on the bolt having recesses in its outer face, a clevis of resilient material having spring legs engageable in said recesses and outward bulges, and a member on said stub engageable with the crown of the clevis to compress the same and force the legs tightly into said recesses.

3. In a nut fastener, a bolt, a nut, a stub projecting therefrom outwardly from its end, and a resilient clevis having spring legs and outward bulges intermediate said legs and crown and whose crown is on the said stub and whose legs have terminals engageable in recesses in the end of the nut to be forced endwise into said recesses as the crown of the clevis is compressed.

JAMES W. IVORY.

Witnesses:
JOHN A. WIEDERSHEIM,
N. BUSSINGER.